March 5, 1968 R. THREADGOLD 3,372,380

DATA HANDLING APPARATUS

Filed Sept. 8, 1964 2 Sheets-Sheet 1

3,372,380
DATA HANDLING APPARATUS

Ronald Threadgold and David Hartley, Liverpool, England, assignors to Automatic Telephone & Electric Company Limited, Liverpool, England, a British company Filed Sept. 8, 1964, Ser. No. 395,095
Claims priority, application Great Britain, Sept. 20, 1963, 37,141/63
6 Claims. (Cl. 340—172.5)

ABSTRACT OF THE DISCLOSURE

Data handling apparatus including control means and a plurality of functional elements arranged to be operated sequentially for carrying out a required data handling operation under the control of the control means, each functional element being arranged to perform a predetermined function on data applied to it upon the application of a start signal individual to each functional element, and in which each functional element comprises function monitoring means for deriving an output signal only upon the successful completion of its function by that functional element, and in which the start signal for each, but the first functional element in the sequence, is derived from the output signal signifying the successful completion of the function of the immediately preceding functional element and from said control means.

This invention relates to data handling apparatus.

Data handling systems as used for example in programmed computers fall into two distinct categories, synchronous systems and asynchronous systems. Synchronous systems generally involve serial transmission of pulses representing the bits of a word or operand, and these must be made to follow each other in a strict time sequence; thus the entire computer must be operated under the control of a master clock device.

The asynchronous system, however, employing parallel transmission of the pulses representing the bits of a word or operand, does not require any fixed time relationship between the bits of a word or operand. The various operations in this case are therefore self-timing. The central control system initiates the start of a particular logical operation which is completed by the relevant logical elements in its own time; upon completion of the operation, a signal, generated by the logical elements in use, indicates to the central control system that the logical operation is complete and that the next operation may commence. The time taken for each operation is controlled first by the speed of operation of each logical element and secondly by the numerical magnitude of the words to be manipulated. In many cases the arithmetic operations may be controlled by a clock to ensure synchronisation between these units and the central control.

The central control system is itself controlled by a clock which for example may be used to control an instruction store. This clock system allows the generation of "start" and "complete" signals which are distributed between the main control unit and the various operational sections of the computer (e.g. the arithmetic unit, the main memory etc.).

The "start" and "complete" signals must obviously take the form of pulses and these pulses must be of defined size and duration. The physical distance over which these pulses must be transmitted in large computers causes appreciable delays and accordingly a reduction in the speed of operation of the computer. Such "start" and "complete" pulses are also susceptible to edge distortion, causing the effective lengthening of the period of the pulse.

According to a feature of this invention, data handling apparatus includes a control unit arranged to select two or more functional elements of the apparatus whose sequential operation is necessary for the performance of a required data handling operation, the said two or more functional elements being so associated that when selected by the control unit they perform their respective functions in sequence and that the successful completion by a first element of its said function gives rise to an output condition which is applied directly to the next successive element in the said sequence to initiate the performance of its function in the sequence. The control unit thus "conditions" the functional elements required to perform a given operation but plays no part in initiating the operation of the various elements at the instants required by the performance of the operation. The delays involved in the propagation of "start" and "complete" signals between the functional elements and the control unit are therefore avoided.

A given set of functional elements may be associated so as to be capable of performing two or more different operations in accordance with the set of "conditioning" signals applied to them by the control unit.

A set of functional elements associated so as to perform a frequently required operation in a computer may be termed a "microprogramme section" of the computer. Such sections may be under the exclusive control of the control unit, "start" and "complete" signals being passed between the control unit and each microprogramme section. Alternatively the sections in turn may be so associated that on appropriate "conditioning" by the control unit two or more sections operate in sequence, without further action by the control unit, to carry out a more complex function.

The foregoing and other features of the invention are embodied in preferred form in the computer "microprogramme section" hereinafter described with reference to the accompanying drawings, in which.

Figure 1:
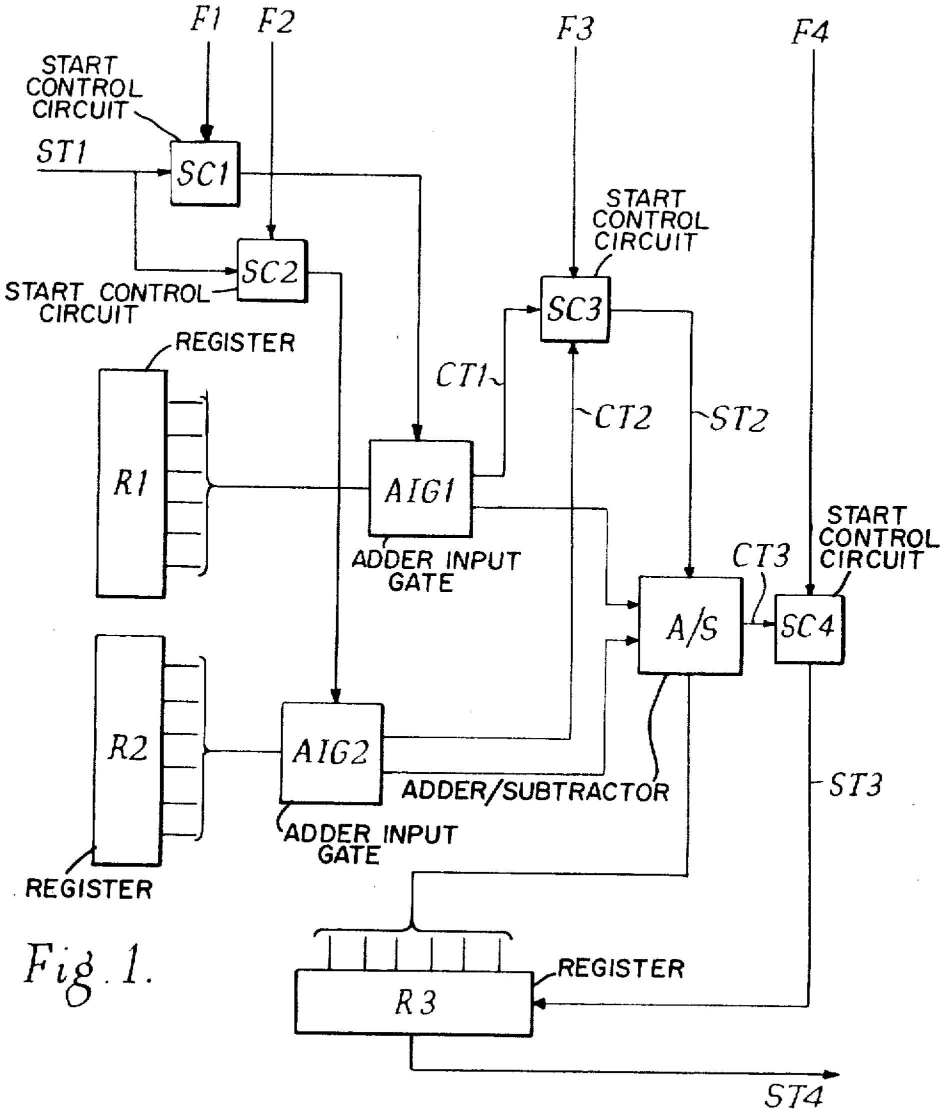
FIGURE 1 shows a block diagram of the microprogramme section.

The drawings show an adder/subtractor microprogramme section A/S for a programmed computer; in the following description it will be assumed that two binary numbers stored in registers R1 and R2 are to be added.

The initial step consists in the passing by the central programmed control unit (not shown) of the computer of signals over leads F1 to F4 to condition the "start" control circuits SC1 to SC4 respectively. These signals from the control unit define the process to be carried out by the functional elements of the section; in the example portrayed in the drawings these signals will condition gates in SC1 to SC4 to allow the operands stored in registers R1 and R2 to be added and the resultant operand to be stored in register R3.

When it is desired to commence the adding operation, for example after the input routine for the particular operation has been completed, a change in voltage level (e.g. from 0 volts to −6 bolts) is experienced on lead ST1. This "start" condition, gated in accordance with the conditioning signals on leads F1 and F2 respectively in SC1 and SC2, initiates the transfer of the operands stored in registers R1 and R2 to the adder input gates AIG1 and AIG2 respectively. The validity of each transfer is ascertained in the adder input gates and, if the transfers are valid, signals are produced over leads CT1 and CT2 respectively, to indicate to the next start control circuit SC3 that the transfer operation is complete. The signals on leads CT1 and CT2 are "operation complete" signals and when gated together at the input of SC3 produce a "start" signal for the next operation. As circuit SC3 is particularly concerned with the control of the adder/subtractor it may be physically arranged in close proximity to the adder input gates AIG1 and AIG2 and the adder/subtractor; thus the "complete" signals from the adder input gates may be "step" signals as stated for the "start" signal on lead ST1.

The "complete" signals from leads CT1 and CT2 are gated by the "conditioning" signal on lead F3 and produce a "start" signal over lead ST2 to cause the addition of the two operands, now held in the adder input gates, to be performed in the adder/subtractor circuit A/S.

When the addition process is complete, as sensed by the detection of carry propagation completion, a "complete" signal is produced over lead CT3 to indicate to start control unit SC4 that this is so. This signal, again in D.C. form as mentioned previously, is gated with the signal on lead F4, to produce a "start" signal over lead ST3 which gates the resultant operand from the adder/subtractor circuit A/S into register R3.

When the resultant operand is stored in register R3 and the validity of the transfer checked a "complete" signal, again in D.C. form, is produced over lead ST4 to be used as a start signal for the next microprogramme order or next programme instruction from the main control unit.

The signals produced on leads F1 to F4 may conveniently be gated signals in response to the functional operations required to perform the order stated in the main programme. For example the order *add* requires transfer of the two required operands from store to an adder-circuit, addition of these two operands and "write-back" of the resultant to a third store address. These operations may individually be considered as micro-orders forming a microprogramme. The main programme order, *add,* when sensed by the input routine for the computer may be arranged to select a particular circuit which defines these F1 to F4 signals. Additional circuitry may be used to define the required addresses of the main store, as stated in the main programme instruction word, containing the operands to be used in the computation and also to define the store address to be used in the resultant write-back process. The pattern of signals therefore produced on all leads F in the computer to the various sections of the computer arithmetic unit defines the micro-orders for the microprogramme required for each function or command.

The final output signal from register R3 in FIGURE 1 on lead ST4 may be used to initiate the next order in the main programme or to initiate the next micro-order of the microprogramme.

The operation of the computer circuit described above is completely asynchronous, the completion indication for each micro-order or main programme order being used as the start indication for the next micro-order or main programme order. It has been stated that the signals employed are D.C. "step" signals and, as the control circuits for each logical or arithmetical unit are located within the respective unit, advantage of the high-speed of operation of "edge" logic may be taken. This is of great importance in large parallel-mode computers and the equipment shown in FIGURE 1 is particularly arranged for this mode of operation. A further point of importance with reference to high-speed operation is the fact that the "complete" signal, over CT3, is produced at the precise time when the adder/subtractor circuit A/S has completed its computation. Thus the time taken for addition or subtraction is solely dependent upon the time for the carries to propagate and therefore the fastest addition or subtraction time for each individual computation is always obtained.

Figure 2:
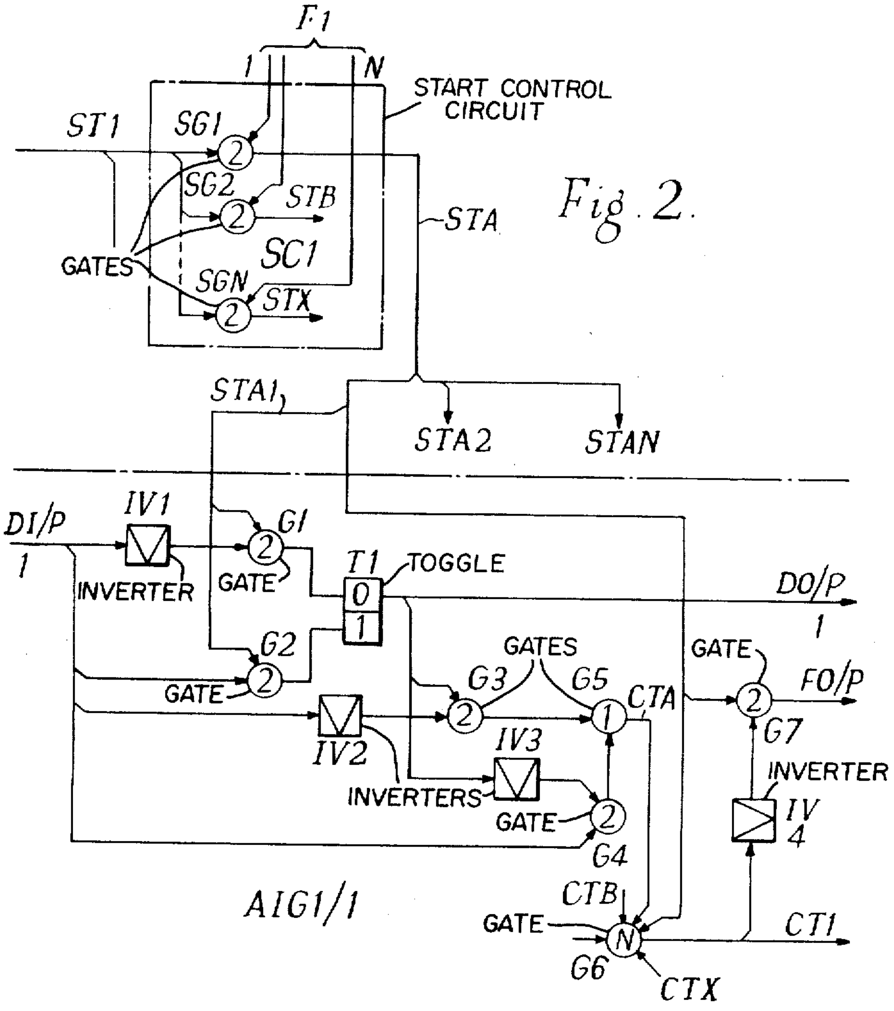
FIGURE 2 shows a logical diagram of part of the equipment shown in FIGURE 1.

FIGURE 2 shows one stage of the adder input gate AIG1 shown in FIGURE 1 and the required selection gate in start control circuit SC1. It will be assumed that negative-going logic is employed and that the voltage levels are 0 volts for "0" condition and −6 volts for a "1" condition.

When it is required to initiate the transfer of the operands from registers R1 and R2 the voltage level on lead ST1 changes from 0 volts to −6 volts and this "edge" is passed by AND gate SG1, conditioned by a −6 volts condition on lead F1/1, on to lead STA. This lead is distributed to all the stages of the addition input gate AIG1 by leads STA1 to STAN. Only the first stage AIG1/1 of the adder input gate AIG1, controlled by lead STA1, is shown in FIGURE 2. Lead STA1 is applied to two AND gates G1 and G2 which control toggle T1. Toggle T1 is used to store the first data bit of the operand stored in register R1 which is supplied over lead DI/P1. If this bit is a "1" the potential on lead DI/P1 will be −6 volts. Thus only gate G2 will be opened by the application of the negative going "edge" on lead STA1. The output from inverter IV1 will be 0 volts holding AND gate G1 closed. The negative output from gate G2 sets toggle T1 to the "1" state causing the data bit output lead DO/P1, which is particular to the first bit of the operand stored in register R1, to assume a potential of 0 volts. The data bit input on lead DI/P1 is also applied to two further AND gates, gate G3 via inverter IV2 and gate G4 directly. These gates together with OR gate G5 are used to check the validity of the condition of toggle T1.

Assuming, as above, that the condition of lead DI/P1 is negative then AND gate G4 is opened when toggle T1 is "set," i.e. output from T1 reset side is at 0 volts. AND gate G3 is held closed as both inputs to this gate are positive (i.e. 0 volts) due to inverter IV2 and the set condition of toggle T1. The negative going "edge" generated by the setting of toggle T1 is gated through OR gate G5 to lead CTA which is fed to AND gate G6. This gate, which in practice due to gate capacity restrictions may be a number of AND gates feeding a further AND gate, is fed by similar leads to lead CTA, shown as leads CTB, CTC to CTX, from all the stages in the adder input gate AIG1 shown in FIGURE 1.

Assuming now that the data bit input is a "zero" (i.e. lead DI/P1 is at a potential of 0 volts). In this case gate G1 is opened by the negative-going "edge" on lead STA1 as the output of inverter IV1 will be negative. Toggle T1 is therefore reset by this "edge" and the output on lead DO/P1 becomes −6 volts. AND gate G3 is, therefore, opened by the resetting of toggle T1 due to inverter IV2. The negative-going "edge" generated by the resetting of toggle T1 is gated by OR gate G5 on to lead CTA.

Thus it can be seen that a negative-going "edge" on lead CTA is experienced, generated by the setting or resetting of toggle T1, whenever the validity of the transfer of an individual bit from the register holding the operand to the adder input gate is proved. The corresponding leads for each stage of the adder input-gate are fed to AND gate G6 together with lead STA. Thus, when the validity of the entire transfer has been proved, a negative-going "edge" output is produced on lead CT1 which indicates to the next stage of the arithmetic unit, the start control circuit SC3 for the adder/subtractor circuit A/S, that the operation performed by the adder input gate AIG1 is complete and successful. The negative going edge on lead CT1 will be gated with the condition on lead CT2 to produce a "start" pulse for the next order stage of the microprogramme.

Should any of the checking circuits, such as that formed by inverters IV2 and IV3 and gates G3, G4 and G5 indicate that the data bit stored by the adder input gate toggles such as toggle T1, differs from the data bit on the register output lead, such as lead DI/P1, a fault indication is produced on lead FO/P.

Assuming that a "1" condition is presented on lead DI/P1 and the toggle T1 remains in the reset condition. The output of toggle T1 will be −6 volts and lead DI/P1 will be −6 volts, thus, the inputs to gate G3 will be −6 volts and 0 volts respectively and to gate G4 will be 0 volts and −6 volts respectively. Thus the outputs from both AND gates will be positive and hence lead CTA will be at 0 volts. AND gate G6 will be held closed by lead CTA and lead CT1 will remain at 0 volts stopping the microprogramme at the faulty order stage. The ouput from inverter IV4 will be negative which allows the negative going edge on lead STA to open AND gate G7 causing a negative going charge to be produced on lead FO/P which may be used to indicate a fault condition.

The checking arrangement for the transfer function has been described as a typical example. Checking arrangements for the arithmetic process may also be provided and typically may take the form of two computation units working in parallel. In this case a comparison of the resultants is made and the result of this comparison may be used to gate with a signal which indicates the completion of the arithmetic to produce a "complete" signal, for example a signal on lead CT3 in FIGURE 1, to the next stage of the microprogramme. Alternatively the arithmetic operation may be checked by performing its inverse, subtraction being the inverse of addition, division the inverse of multiplication, etc. This final method, however, suffers from the fact that it is time consuming and is not favoured in large parallel-operated systems.

It will be appreciated, from the description of the logical elements that may be used in the transfer of data from a store or register to an arithmetic unit, that the time taken in a system employing the invention for each logical or arithmetic operation is only that time for the logical elements to respond to the initial "start" signal and the time taken for the actual computation. A system using the invention, therefore, is a completely asynchronous system.

Alternative arrangements for checking the correct manipulation of the data between order stages of the microprogramme may present themselves to those skilled in the art.

What we claim is:

1. Data handling apparatus, comprising
a plurality of normally non-conditioned functional element means each including a data input terminal, a conditioning input terminal, a data output terminal, and an additional output terminal, said functional element means being operable, when conditioned, to provide an "operation complete" signal on said additional output terminal upon the successful completion of the function to be performed by said functional element means;
a plurality of normally non-conditioned gate means associated with each of said functional element means, respectively, each of said gate means including a "start" signal input terminal, a "conditioning" signal input terminal, and an output terminal connected with the conditioning input terminal of the associated functional element means;
means connecting said functional element means in series with the data output and additional output terminals of each functional element means being connected with the data input terminal of the succeeding functional element means and the "start" input terminal of the gate means associated therewith, respectively;
a data source connected with the data input terminal of the first one of said series of functional element means;
a source of "start" signals connected with the "start" signal input terminal of the gate means associated with the first one of said function element means;
and control means supplying conditioning signals to the conditioning signal input terminals of said gate means, respectively, for conditioning said gate means to control the sequential operation of said functional element means.

2. Data handling apparatus as defined in claim 1, wherein said function monitoring means comprises a transistor gating circuit arrangement.

3. Data handling apparatus, comprising
a plurality of functional elements for performing particular data handling operations;
means for applying data to said elements, said elements being so connected that at least two said elements serve to transfer the data, a third element serves to add or subtract the transferred data, and a fourth element serves to register the resultant from the add/subtract operation;
control means for controlling the sequential operation of said functional elements;
gating means individual to said functional elements;
start signal producing means cooperable with said control means for initiating operation of the first of said elements in the operating sequence; and
function monitoring means appertaining to each functional element for providing an output signal upon the successful completion of the function to be performed by the appertaining functional element, said functional monitoring means being cooperable with said control means for initiating operation of the next succeeding functional element through gating means appertaining to said next succeeding functional element.

4. Data handling apparatus, comprising
a plurality of functional elements for carrying out particular data handling operations;
means for applying data to said elements;
control means for controlling the sequential operation of said functional elements;
gating means individual to said functional elements;
start signal producing means cooperable with said control means for initiating operation of the first of said elements in the operating sequence;
function monitoring means appertaining to each functional element for providing an output signal upon the successful completion of the function to be performed by the appertaining element, said function monitoring means being cooperable with said control means for initiating operation of the next succeeding functional element through the gating means appertaining to said next succeeding functional element;
register means for storing data;
data read-out means;
means associated with at least one of the functional elements for transferring stored data from the register equipment to the data read-out means;
and a plurality of gating circuits forming at least part of the function monitoring means appertaining to said one functional element for comparing input signals applied to the data read-out means with the instantaneous condition of the data read-out means, and for providing an output signal signifying the successful completion of the transfer of the stored information when correspondence obtains between said input signals and said instantaneous condition of the data responsive means.

5. Data handling apparatus as defined in claim 4, wherein said data read-out means comprises a plurality of bi-stable transistor circuits each of which serves for storing data in code form and has associated with it a function monitoring element forming part of the function monitoring means and arranged for monitoring the operation of the bi-stable transistor circuit with which it is individually associated.

6. Data handling apparatus as defined in claim 4, in which a succeeding functional element performs its function upon receipt of the output condition being gated out of a gating circuit.

References Cited

UNITED STATES PATENTS 2,674,732 4/1954 Robbins ---------- 340—347

ROBERT C. BAILEY, *Primary Examiner.*

R. ZACHE, *Assistant Examiner.*